United States Patent [19]

Bittleston et al.

[11] Patent Number: 5,284,207

[45] Date of Patent: Feb. 8, 1994

[54] METHOD OF CLEANING A WELL BORE PRIOR TO A CEMENTING OPERATION

[75] Inventors: Simon H. Bittleston, Fen Drayton; Andrew Hunt, West Hembury Farm; Mostafa A. Tehrani, Ely, all of England

[73] Assignee: Schlumberger Technology Corporation, Houston, Tex.

[21] Appl. No.: 882,778

[22] Filed: May 14, 1992

[30] Foreign Application Priority Data

May 14, 1991 [GB] United Kingdom ................. 9110451

[51] Int. Cl.$^5$ ....................... E21B 33/16; E21B 37/00
[52] U.S. Cl. ..................................... 166/291; 166/285; 166/312; 252/8.552
[58] Field of Search ............... 166/285, 291, 309, 312; 252/8.552

[56] References Cited

U.S. PATENT DOCUMENTS

| | | | |
|---|---|---|---|
| 2,964,109 | 12/1960 | Martin | 166/312 X |
| 3,637,021 | 1/1972 | Hutchison et al. | 166/309 |
| 3,640,344 | 2/1972 | Brandon | 166/249 |
| 3,662,828 | 5/1972 | Hutchison | 166/312 |
| 3,853,176 | 12/1974 | Heinrich | 166/312 X |
| 3,884,302 | 5/1975 | Messenger | 166/291 |
| 4,060,130 | 11/1977 | Hart | 166/312 |
| 4,088,191 | 5/1978 | Hutchison | 166/312 X |
| 4,093,028 | 6/1978 | Brandon | 166/291 X |
| 4,187,911 | 2/1980 | Hutchison et al. | 166/312 |
| 4,457,375 | 7/1984 | Cummins | 166/309 |
| 4,530,402 | 7/1985 | Smith et al. | 166/291 |
| 4,548,271 | 10/1985 | Keller | 166/291 |
| 4,588,031 | 5/1986 | Oliver, Jr. et al. | 166/291 |
| 4,588,445 | 5/1986 | Oliver et al. | 166/312 X |

Primary Examiner—George A. Suchfield
Attorney, Agent, or Firm—John J. Ryberg; Wayne I. Kanak

[57] ABSTRACT

Once the drilling of an oil or gas well is finished the bore must be cased and cemented. It is important that the cement lining be complete, and to ensure this it is necessary to sweep out the mud in the annulus ahead of the rising cement. Unfortunately, this often proves difficult, and various procedures and mechanisms have been devised in the past to improve the chances of achieving efficient mud-removal and forming a complete cement lining, though none have been truly successful. One of the techniques presently employed involves the utilization of a wash, but it has been noted that such a wash, even when turbulent, has very little component of its movement in the annulus in a direction other than up along the annulus, and that as a result it has very little effect on gelled mud deposits, especially those in the small casing/bore inter-distance of a severely eccentric casing. It has now been discovered that a considerably increased amount of lateral motion, and thus a very significantly enhanced degree of mud removal capability, is provided if the liquid be a multiphase liquid in which one of the phases is a gas—in other words, if the liquid be full of bubbles—and the invention provides a cleaning method particularly suitable for the cleaning of gelled mud deposits off the casing and bore walls of an oil/gas well prior to cementing the casing in place, in which there is caused to flow over and in contact with the dirty surface a "burbulent" liquid.

9 Claims, 8 Drawing Sheets

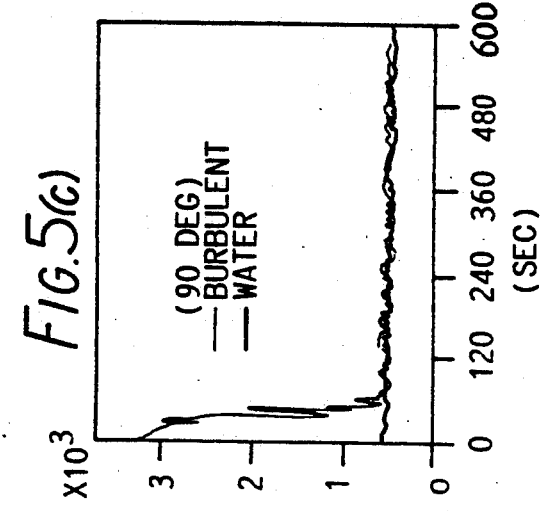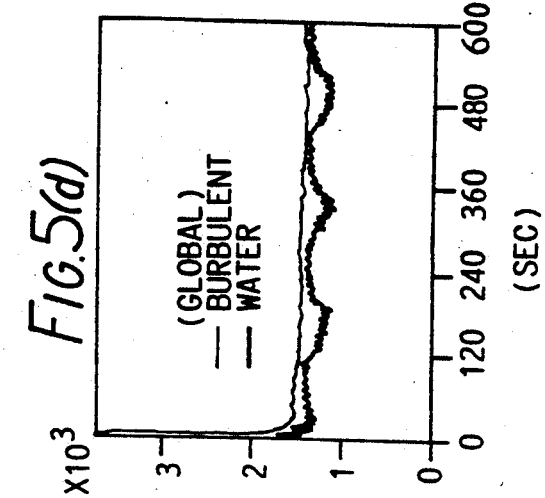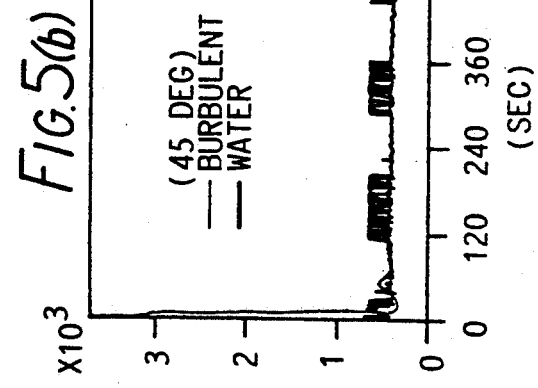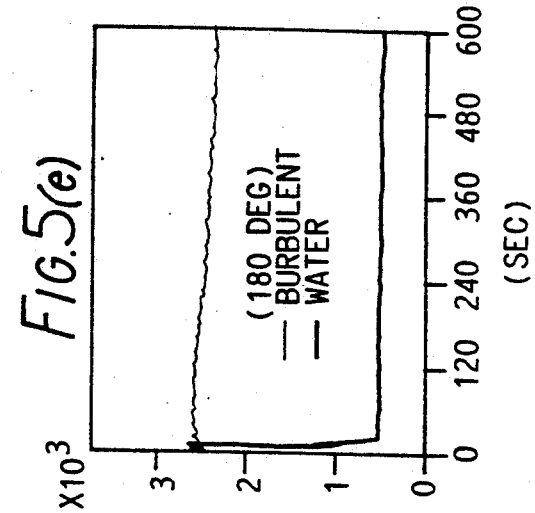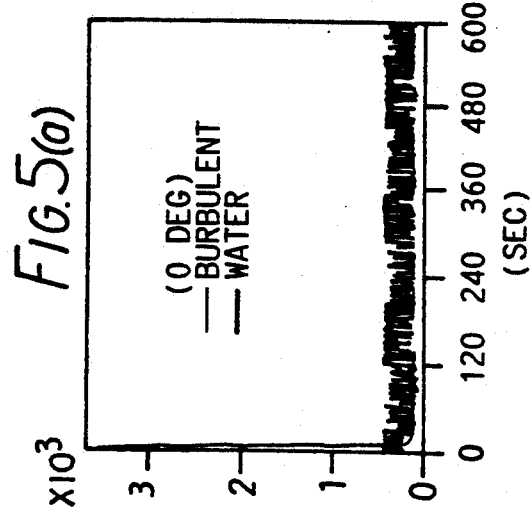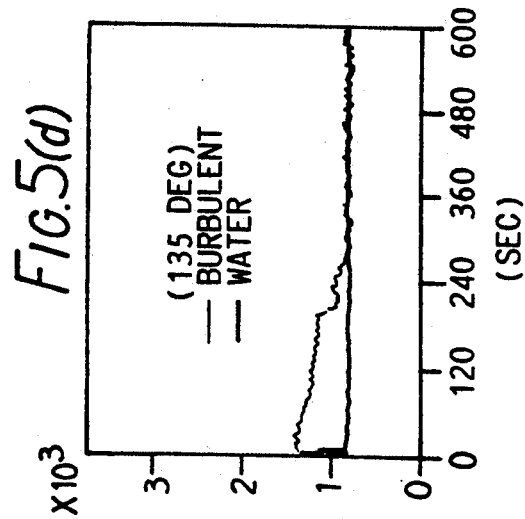

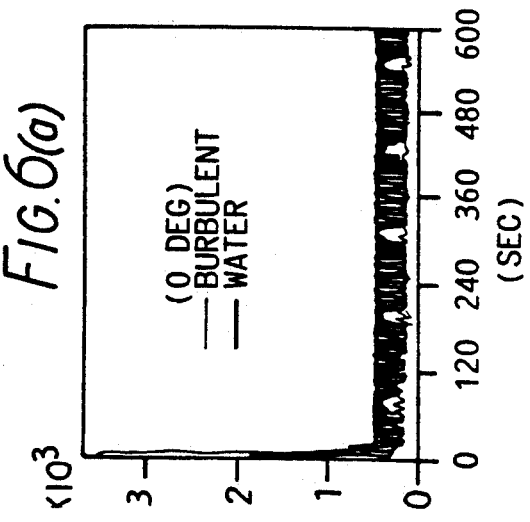
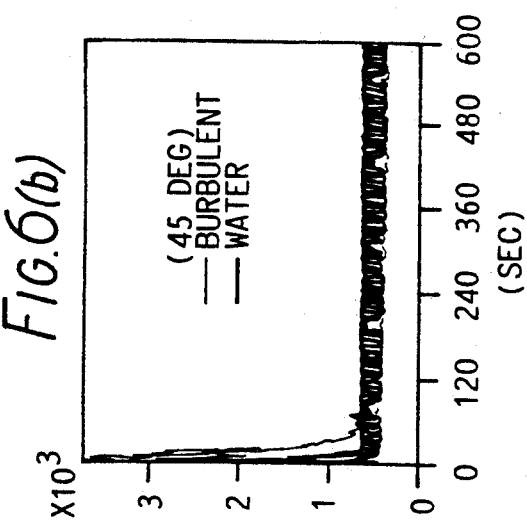
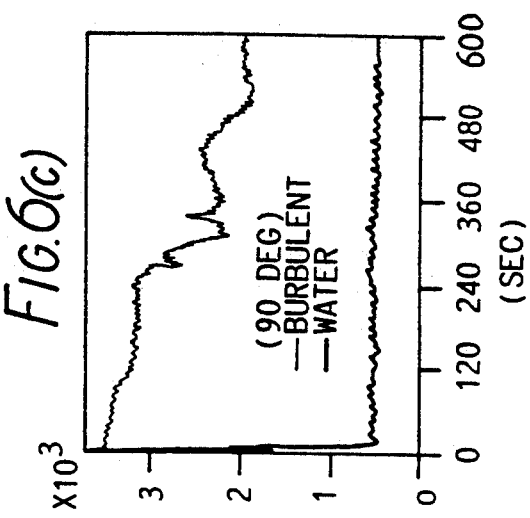
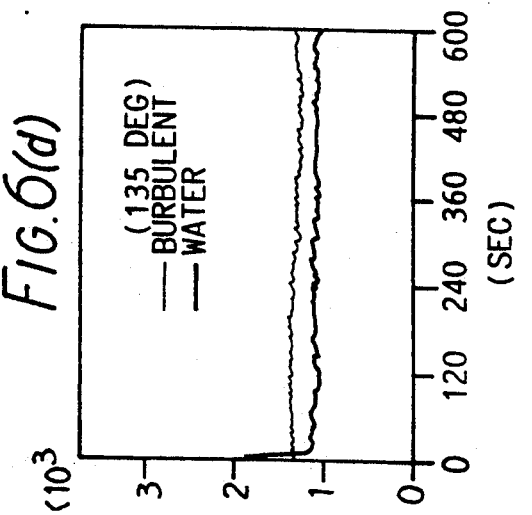
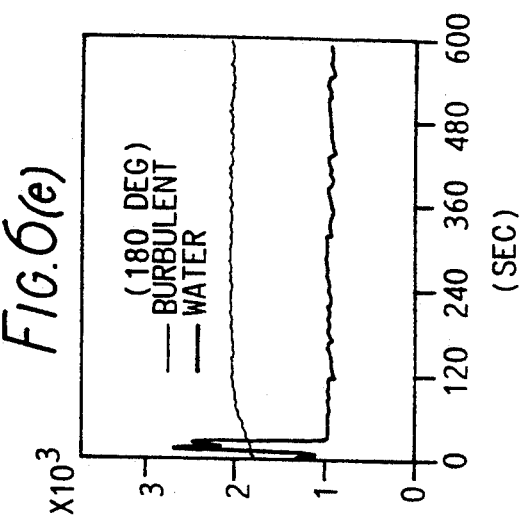
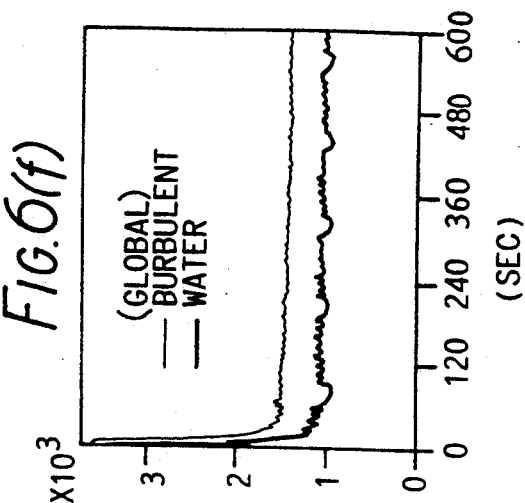

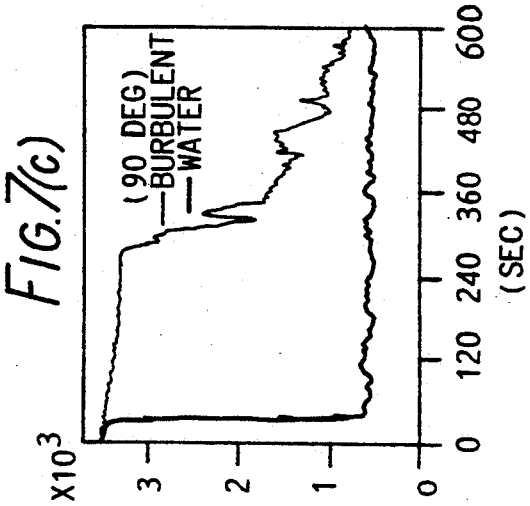
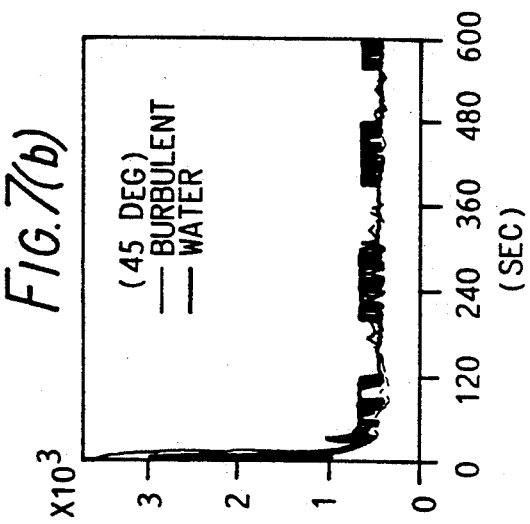
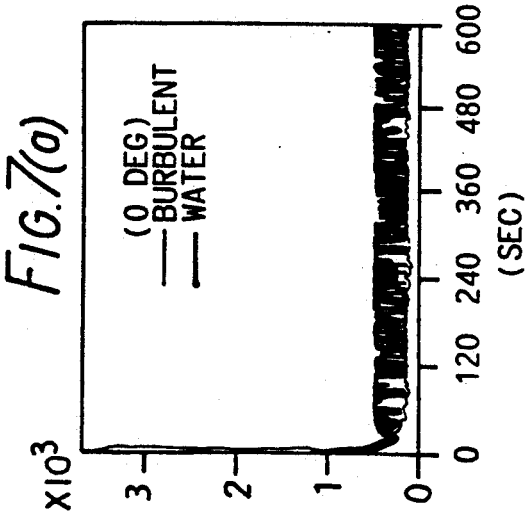
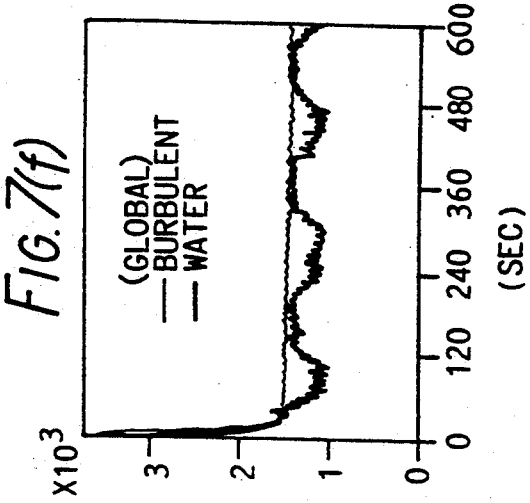
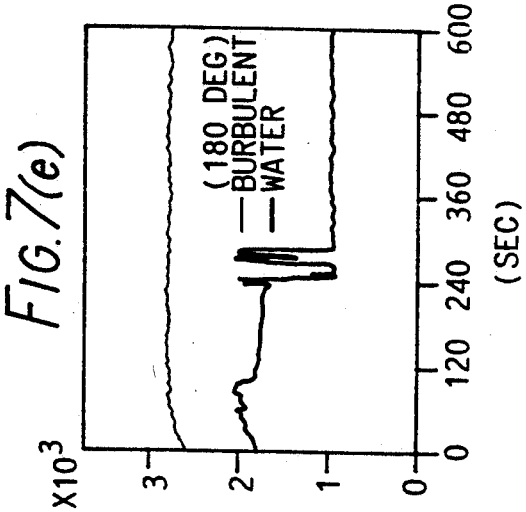
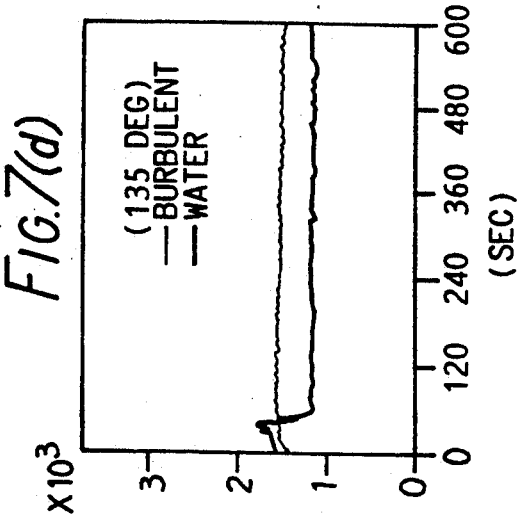

METHOD OF CLEANING A WELL BORE PRIOR TO A CEMENTING OPERATION

BACKGROUND OF THE INVENTION

1. Field of the Invention

This invention relates to cleaning methods, and concerns in particular the removal of drilling fluid or "mud" from the annular space between the casing and the sides of the bore of an oil/gas well prior to cementing in.

The construction of a well, such as an oil well, involves the drilling of a borehole into the ground through the geological formations of interest. Drilling mud is used to lubricate and cool the drill bit, to assist in bringing the drill cuttings up to the surface, and to provide sufficient hydrostatic pressure within the well to prevent the bore collapsing under the forces experienced deep underground and to prevent the influx of fluids from the formation while drilling is taking place. A typical present-day water-based mud is an aqueous mixture of bentonite clays, carboxymethyl-cellulose, xanthan gum, barite and other constituents such as polymers etc.

2. Description of the Prior Art

Once the drilling is finished the bore must be cased and cemented, a procedure in which first the casing, having an external diameter a little smaller than the bore diameter, is placed in the mud-filled bore and then cemented (as a fine slurry having a typical "generic" composition of cement and water, with small amounts of accelerator, retarder, fluid loss additive, dispersant, extender, weighting agent and various additives to control properties such as thixotropy, gel strength and foaming) is fed into the annulus between the casing and the borehole wall, and allowed to set to form a lining therefor. It is common procedure to supply this cement to the top of the casing, and then to pump it down the inside of the casing to the bottom and then up the outside of the casing, between the casing and the bore walls, until it fills and lines the annulus. In practice a loose-fitting "rubber"-like bung (with a frangible/rupturable centre section) is placed in the casing on top of the mud already therein, cement is then pumped in on top to provide a "plug"-like volume of cement calculated to be enough to fill the annulus, a second bung is placed on top of the cement, and then more mud is pumped in to force the bung-bounded plug of cement down to the bottom of the casing. When the lower plug reaches a restriction at the bottom of the casing an increase in applied pressure ruptures the bottom bung, and the cement is pumped out of the bottom of the casing and then back up to the top, but now on the outside, in the annulus. As it progresses up the annulus, so it fills up the space, seeping into all the cracks and fissures in the bore wall, and then setting to provide the desired sealing of the sides of the bore.

It is important that the cement lining be complete—that there be no places where the volume between casing and bore wall be empty of cement, and that the cement be well bonded both to the casing exterior and to the bore walls—and to ensure this it is of course necessary to sweep out the mud in the annulus ahead of the rising cement. Unfortunately, this often proves extremely difficult, and various procedures and mechanisms have been devised in the past to improve the chances of achieving efficient mud-removal and forming a complete cement lining. Indeed, mud removal is especially difficult in situations where the casing is not properly co-axial with the bore (where the eccentricity, or offset, of the casing in the bore is high, and conversely where on one side the "stand-off" of the casing from the bore is low), and where, as is increasingly the case these days, the mud is or includes one or more of the various polymeric ingredients which give it many desirable properties but which also can cause it to gel, and thus make it much more difficult to remove. Some of the techniques and equipment employed to assist in mud removal are: "mud conditioning", in which mud is circulated around the system for some time prior to pumping in the cement, in an effort to make more mobile any "congealed" mud already existing; "casing movement", in which the entire string of pipe constituting the casing is physically moved, by lifting/dropping and rotation, to break up any mud deposits; "casing centralisers", used when running in the casing in an attempt to prevent it being placed eccentrically; and "scratchers", which travel up and down with the casing, rotating as it is rotated, to scratch away gelled mud.

It is also possible, and indeed desirable, to employ, ahead of the cement, liquids that will literally wash the mud off the casing and bore walls. These can be pumped into the casing on top of the mud and before the cement, and may be of the type known as "chemical washes", usually low-viscosity liquids containing surfactants and mud thinners, or "spacers", rather more viscous, gel-like liquids that are primarily to form a buffer between the cement and the mud.

Unfortunately, although all these mud removal schemes do work, they cannot be guaranteed, especially where the casing eccentricity is high (so that the casing is in parts of its length touching, or almost touching, the side of the bore), and it is very common for the cement to fail properly to fill the annular space because of mud trapped immovably between casing and bore wall, so that there results a cement void. So common, indeed, is this that not only do around 50% of all bores fail in this way, and have to be rectified by an expensive operation known as "squeezing" (after locating the failure area, a hole is explosively blown in the casing at the appropriate spot, and cement is then pumped directly through the hole into the void), but as many as 30% fail in more than one place.

It will be evident that there is a considerable need for an effective way of removing the mud, especially gelled mud, from the annulus ahead of the cement, and the invention proposes a novel technique which is intended for this purpose.

SUMMARY OF THE INVENTION

As noted above, one of the techniques presently employed involves the utilisation of a wash. In this technique there is positioned in the casing below—that is, ahead of—the cement (and possibly with a bung separating the two) a volume of a low viscosity liquid, such as water, with a range of additives such as solvents and surfactants, and this is driven down the casing and then back up the annulus (usually under turbulent flow conditions), cleaning the mud off as it goes. It has been noted, however, that such a wash, even when turbulent, has very little component of its movement in the annulus in a direction other than up along the annulus, and that as a result it has very little effect on gelled mud deposits, especially those in the small casing/bore interdistance of a severely eccentric casing, for once the more obviously laterally projecting portions of the mud deposit are swept away it is difficult if not impossible for the subsequent liquid flow to penetrate sideways to the remaining mud trapped in the narrowest parts. It has now been discovered that a considerably increased amount of lateral motion (even when overall the liquid would seem to be of low turbulence, although the effect is more noticeable when it is turbulent), and thus a very significantly enhanced degree of mud removal capability, is provided if the liquid is a multiphase liquid in which one of the phases is a gas—in other words, if the liquid is full of bubbles.

In one aspect, therefore, the invention provides a method of cleaning a dirty surface in a confined space, which method is suitable for the cleaning of gelled mud deposits off the casing and bore walls of an oil/gas well prior to cementing the casing in place, in which there is caused to flow over and in contact with the dirty surface a bubbly, turbulent liquid.

The term "bubbly, turbulent liquid" (sometimes "burbulent") refers to a liquid (the carrier) that has entrained therein bubbles of a gaseous phase material, and while such a liquid need not itself show any gross overall turbulence (although in fact such turbulence is preferred).

Although in principle the cleaning method of the invention could be used to clean any dirty surface defining a confined space—the use of a bubbly, turbulent liquid is only practical where the space involved is confined, for otherwise the entrained gas may too easily separate out from the liquid carrier, whereupon the liquid is no longer bubbly, turbulent, and no longer provides the desired enhanced cleaning effect—it is especially useful in the cleaning of the annulus formed by the casing and the walls of a well (and particularly a hydrocarbon-producing well such as a natural gas [methane] or oil well) to remove the drilling mud deposited thereon prior to the filling of the annulus with cement. For the most part the description hereinafter relates, though purely for convenience, only to this cleaning of mud from the casing and borehole walls of a well, and, as will be seen from the Test Results given and discussed hereinafter, the casing/bore cleaning effect of a bubbly, turbulent liquid in such a situation is very significantly greater than that of the carrier liquid alone.

The method of the invention could be employed to clean a surface of any sort of dirt, though primarily it is best suited for use where the dirt is amenable to removal by soaking/washing, or even solvent action, rather than by some sort of chemical action (though, as observed below, it is not excluded that the liquid could be or include one having some chemical reactivity toward the dirt). The mud employed in borehole drilling is typical of dirts removable by washing/soaking in a suitable liquid (in this case, water).

The method of the invention is suitable for cleaning away deposits of any sort of mud as conventionally employed in the drilling of (oil) wells. These muds can be either water- or oil-based. Conventional constituents for a water-based mud are those outlined above, while the ingredients of a typical oil-based mud might bentonite clay, polyanionic cellulose, ferrochrome lignosulphonate, lignite, an asphaltene product, barite and diesel oil.

In accordance with the invention the cleaning effect is attained by causing a bubbly, turbulent liquid (as defined hereinbefore) to flow over the dirty surface. A burbulent liquid is one in which a liquid-phase material carries entrained within itself a gaseous-phase material.

The liquid-phase material may be any appropriate to the cleaning job to be effected—which, in practice, means appropriate to the dirt to be removed, and not too corrosive to the material the surface of which is to be cleaned. It may, for example, be a solvent for the dirt, or it may be a medium in which the dirt is nominally easily dispersed or suspended. It may, of course, be a mixture of two or more liquids, the effect of each supplementing the effect of the other(s). In general, water is the liquid of choice, especially for cleaning well bore/casing of drilling mud.

The liquid may contain one or more additive to improve its cleaning ability. These additives may be any used or suggested for use in such cleaning operations such as chemical washes, as mentioned above—and so may be surfactants/detergents/emulsifiers of various sorts, as well as solvents and co-solvents.

The gas-phase material may, like the liquid, also be any suited to the job—again, appropriate to the dirt and the surface material—and for the cleaning of an oil well casing/bore is desirably an inert gas such as nitrogen (which will commonly be to hand on an oil drilling rig), although with care ordinary air, suitably compressed, is acceptable.

Formation of the bubbly, turbulent liquid—that is, the manner in which the gaseous component is combined with the liquid component in order to produce the desired burbulent composition—may be achieved in any convenient way, though what is convenient will probably depend to a considerable extent on the nature of the cleaning job being undertaken. For example, it may in some circumstances be possible to inject the gas into the liquid at, or just prior to, the point at which the burbulence is required. In a real oil well, however, it is not practical separately to feed high pressure gas to the bottom of the well, and there inject it into the liquid component, and instead an acceptable technique is to fill the top of the casing with a "plug" of the liquid phase and then—on top—a "plug" of the gaseous phase, and then to drive the two together down to the bottom. First the liquid phase is driven out of the bottom of the casing pipe and forced to turn back on itself to travel on up the annulus. Behind the liquid phase, the gaseous phase then follows out of the pipe bottom into the annulus. As it does so—as it actually enters the annulus—the two phases mix violently, to produce the desired burbulent composition, which is then forced up the annulus back towards the surface.

The bubbly, turbulent liquid is caused to flow over and in contact with the dirty surface. As in the case of actually forming the bubbly, turbulent liquid, so it may be caused to flow over the dirty surface in any appropriate way. Thus, in the case of the cleaning of mud from within the annulus of an oil well, the liquid is simply driven along the annulus—conveniently just as though it were a conventional wash, and so ahead of the cement slurry.

The flow rate of the bubbly, turbulent liquid over the dirty surface is an important factor in ensuring that adequate cleaning does in fact occur. The primary requirement is that the relative size and spacing of the bubbles should be such that they and the "turbulence" set up in the liquid should actually provide sufficient motion laterally to the main liquid flow direction that there is produced both a "scouring" effect and significant sideways penetration (to reach into the narrow spaces between a badly eccentric casing and the bore walls). Briefly: if the gas flow rate is too low then the gas phase forms small bubbles which rise within the liquid along the annulus without causing appreciable turbulence. If the gas flow rate is too high, then the gas travels in a continuous (i.e., uninterrupted by the liquid) core in the annulus, with the liquid flowing slowly up the annulus in two thin films on the casing and bore walls. Neither of these two situations generates sufficient lateral motion for effective cleaning of the dirt on the two walls. At intermediate flow rates, the bubbles are large, but not large enough to bridge the annular gap, and produce turbulence and a good lateral motion component. It is this latter condition, called slug/churn flow, that should be achieved.

The matter may be explained in more detail as follows.

The flow patterns produced in two-phase gas-liquid flow through pipes and annuli depend on the superficial velocities of the two phases—that is, on the volume flow rate of each phase divided by the cross-sectional area of flow. In the simplest classification, three main patterns of flow may be distinguished: bubble, slug/churn, and annular. The description now given here refers to a study conducted at Tulsa University Fluid Flow Projects on the flow of air-water mixtures in vertical concentric annuli (internal diameter 4.2 cm, outside diameter 7.6 cm). The classifications can also be applied to larger geometries, such as the casing/wellbore space in an oil well, though then the actual range of absolute velocities defining different flow patterns are different.

At low gas velocities ($<0.05$ m/s), the gas is distributed as discrete bubbles within a continuous liquid phase. There are small spherical bubbles (3–5 mm) and larger "cap" bubbles. At higher liquid velocities ($>1$ m/s) the larger cap bubbles disappear.

As the gas velocity increases (0.05–10 m/s) the flow first changes to "slug" flow in which large cap bubbles move upwards, nearly filling the entire cross-sectional area of the annulus, and then to "churn", which has an oscillatory nature. In churn the liquid slugs become shorter, and are usually blown through by the gas phase; they then break, fall back, and merge with the following slug.

At yet higher gas velocities ($>10$ m/s), the gas flows in a continuous phase in the core—that is, in a region between the two opposed inner/outer surfaces—and carries entrained therein tiny liquid droplets. The annulus surfaces are covered in a slowmoving film of liquid.

The type of flow best for a burbulent wash is that in the slug/churn region, where the chaotic nature of flow boosts the non-axial, lateral components of mixture velocity. It is this that is responsible for the break-up and removal of dirt—i.e., gelled mud—from the surfaces.

It will be apparent that the actual, absolute gas and liquid flow rates depend to a considerable degree on the nature of the cleaning job being undertaken, and what suits a conventional oil well casing/bore situation will not necessarily apply somewhere else. The principle applies, however.

The flow rates and volumes of the gas and liquid phases required for a burbulent wash depend on the well geometry, the depth of the well, and the properties of the mud to be removed. A conventional oil well bore is about a foot (30 cm) in diameter, and the casing to be cemented therein is about 10 in (25 cm) in outside diameter, giving an annular space 1 in (2.5 cm) wide. In such circumstances, and for a depth of 10,000 ft (3,050 m), the estimated velocities in the annulus producing the desired cleaning effect (based on existing experimental evidence) are about 2.5 m/s for the liquid, and 3 m/s for the gaseous phase. Shallower wells would reduce these requirements; a 4,000 ft (1220 m) well is estimated to require a gas velocity of 2 m/s and a liquid velocity of 1 m/s.

BRIEF DESCRIPTION OF THE DRAWINGS

An embodiment of the invention is now described, though by way of illustration only, with reference to Test Results and the accompanying diagrammatic Drawings in which:

FIGS. 5(a)–5(f) show the corresponding plot to FIGS. 4(a)–4(f) for a horizontal test section with a 50 percent offset;

FIGS. 7(a)–7(f) show the corresponding plot to FIGS. 5(a)–5(f) for a 100 percent offset, horizontal test section.

DESCRIPTION OF THE PREFERRED EMBODIMENT

The Test Equipment

Figure 1:
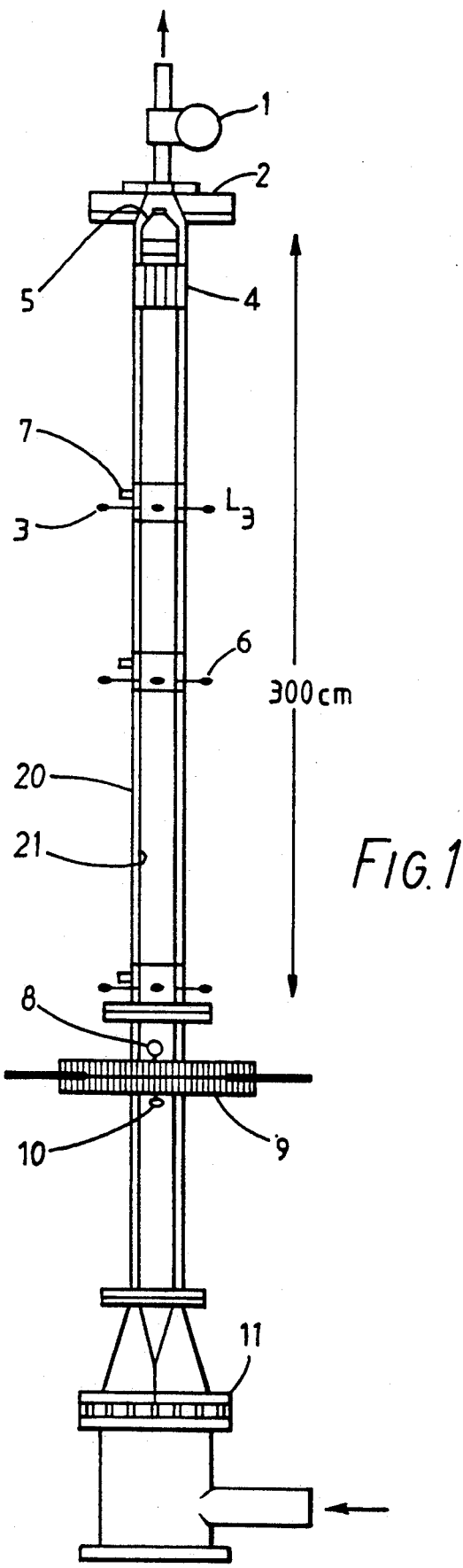
FIG. 1 shows a sectional side view of a Test Rig.

FIG. 1 is a schematic of the test section (shown as three broken and "telescoped" lengths). It mimics a length of well bore (the outer wall 20) with a casing pipe (21) therein, with an annular space between the two (the volume of the annulus—the "hole volume"—was 1.58 liter up to the azimuthal sensors 3, and up to the global sensor 1 it was 2.13 liter: see the comments hereinafter). The eccentricity of the casing 21 in the bore 20 may be adjusted using the top and bottom centralising discs (2 and 11) and the centralising pins (as 6), and the whole may be tilted to any desired angle between vertical and horizontal.

The lower part (as viewed) of the section (upstream of the sliding valve 9) is filled with water, and, with the sliding valve 9 closed, is completely isolated from the upper part (as viewed) where the wash tests take place.

The mud used was a 0.5 wt % solution of IDVIS (a proprietory brand of xanthan gum polymer drilling mud specially suited to "model" work), and was mixed with 0.1 wt % salt (to act as a tracer determinable by its electrical conductivity). The density of the mud was 998 Kg/m$^3$, and its rheology best described by the yield/power law relationship (in SI units) $\tau = 3.810 + 0.560 \gamma^{0.426}$.

The upper part of the test section was filled with mud, and after inclining the section to the required angle—anywhere from vertical to horizontal—the wash, consisting either of water alone (for comparison) or of the bubbly, turbulent air-water mixture of the invention, was admitted through the plug valve (8) just above the sliding valve 9. At that point data acquisition was begun.

The air and water were, in this test, obtained from conventional laboratory supplies, and effectively injected in separately. The water flow rate (measured by observing the volume leaving the section in a given time) was about 11 l/min (turbulence gave it a high Reynolds Number, Re≈2600), or approximately 7 hole volumes per minute, although there are some minor fluctuations. The air flow was not metered, but the volume flow ratio of air:water was about 3:1.

Data was provided by conductivity sensors placed along and around the section. Eight probes (as 3) were placed uniformly (every 45°) around the section at L3 (the annulus was deliberately eccentric, with the widest part arbitrarily given the 0° position) at 0°, 45°, 90°, ... 270° and 315°, and a global (Kent) conductivity transducer (1) was set at the output, to produce a conductivity trace showing the progressive removal of mud by recording a continuous drop in the conductivity of the exit stream.

All the probes produced a high signal initially—i.e., at the start of displacement. Thereafter, the signals decreased as mud was removed by the wash. In positions where mud removal was efficient and went to completion the signal rapidly dropped to a steady low value, but where mud removal was slow and inefficient, or where the mud layer remained completely undisturbed, there was little or no change in the relevant probe signal.

The Test Results

Figure 2:
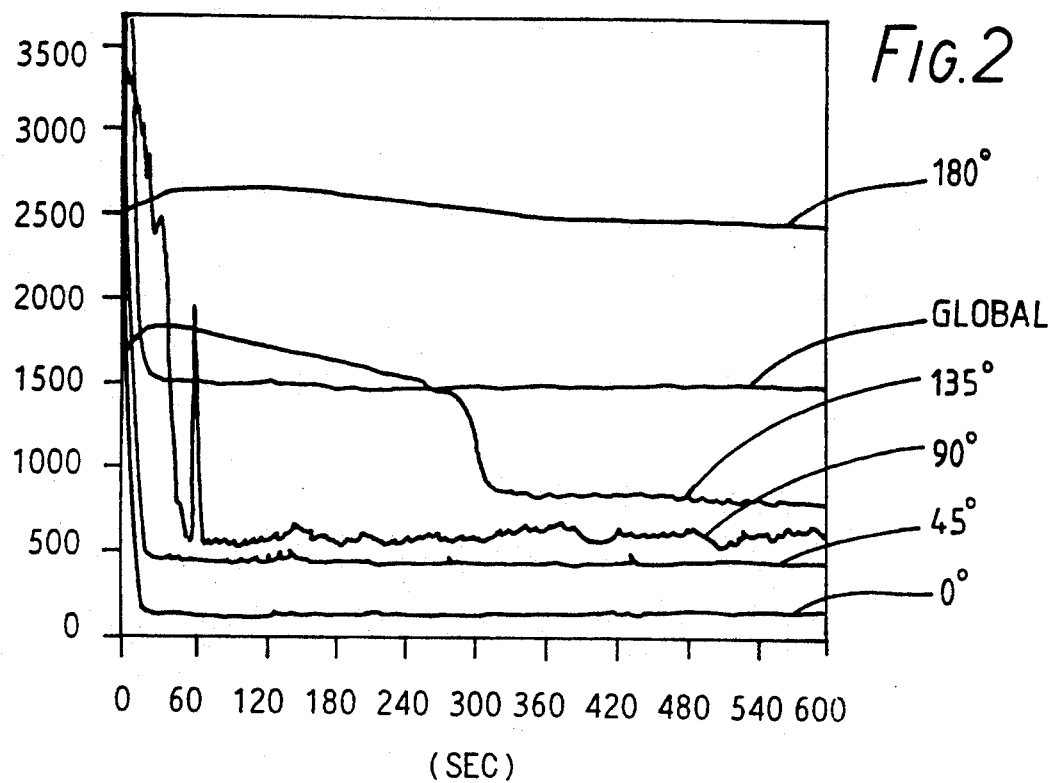
FIG. 2 shows a plot of conductivity traces against time for a prior art method.
Figure 3:
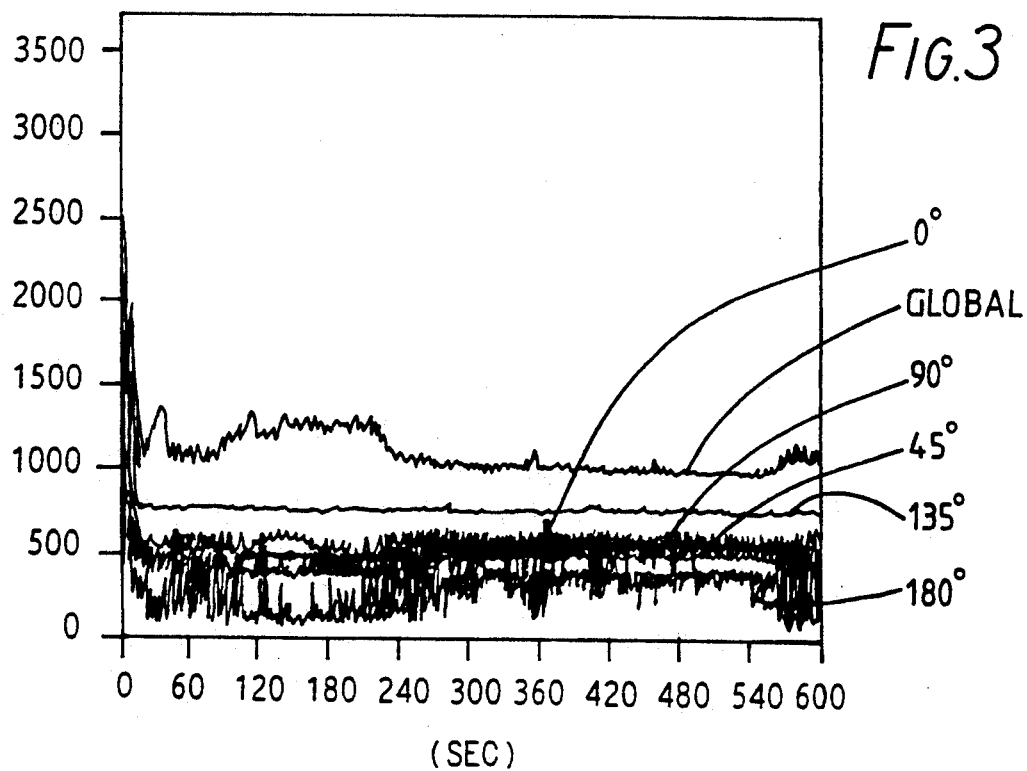
FIG. 3 shows the corresponding plot to FIG. 2 for an embodiment of the present invention.

FIGS. 2 and 3 are groups of graphs showing, for respectively a Prior Art water wash and a burbulent wash of the invention, the conductivity traces produced by the several azimuthal sensors 6 and the global sensor 1 in a vertical annulus with 50% offset. In these graphs, as in all the others, the Y-axis is the raw (unnormalised) sensor signal (and the initial levels merely reflect adjustable gains chosen to separate the signals for clarity; the significant feature is the relative drop, and how quickly it occurs), while the X-axis is time.

The water wash FIG. 2 shows that the mud is removed in the ±45° sector of the annulus after about 2 hole volumes (for this wash one hole volume is equivalent to about 8.6 seconds). Around the 90° position mud removal is somewhat slower, and requires up to 7 hole volumes of water. In the 135° region it is much worse, for over 35 hole volumes are needed before mud removal is complete, while the 180° position is very bad (the sensor output shows little change at all, indicating a layer of immobile mud). The trace from the global conductivity sensor 1 gives after 5 hole volumes a misleadingly low value, one that appears to indicate the bore is clean, despite the fact that a considerable amount of mud is still present in the narrowest part.

FIG. 3 is the graphs for a bubbly, turbulent wash according to the invention (the short-term fluctuations in the traces arise from bubbles sweeping past the sensors). The situation is otherwise the same as that for FIG. 2. It will be clear that mud removal is complete in an amazingly short time (by comparison with the ordinary water wash). Thus, after a mere 7 hole volumes of bubbly, turbulent air/water mixture (about 2 hole volumes of water) all mud has been removed. It is especially notable that mud is removed from the narrower parts very early on.

Figure 4A:
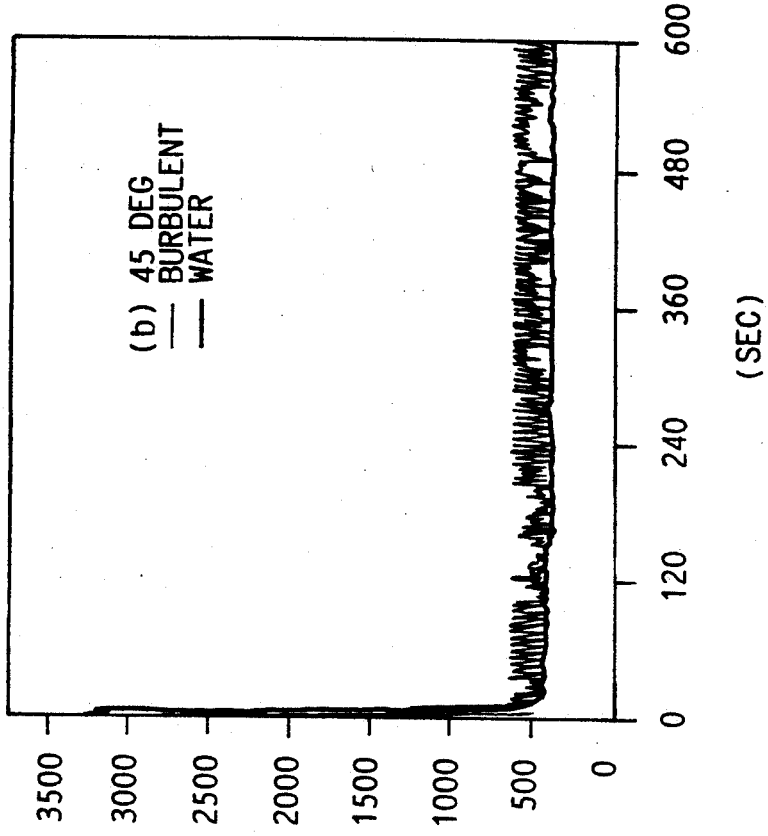
FIGS. 4(a), 4(b), 4(c), 4(d) and 4(e) show conductivity sensor plots against time for both the prior art method and the method according to the present invention at 0°, 45°, 90°, 135° and 180° angular positions around a test section.
Figure 4B:
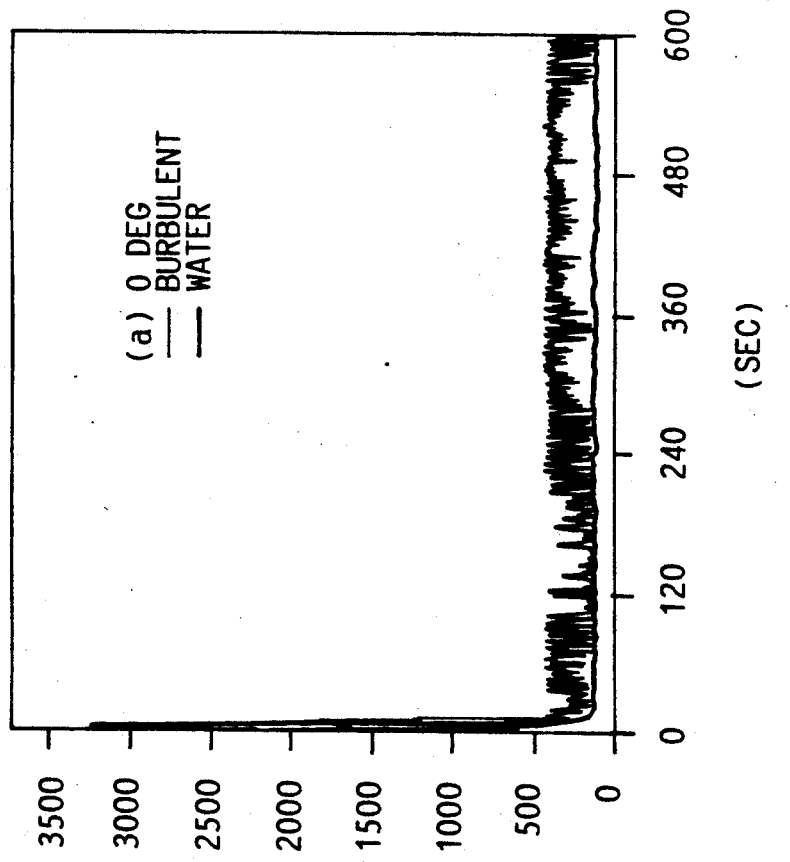
Figures 4C, 4D:
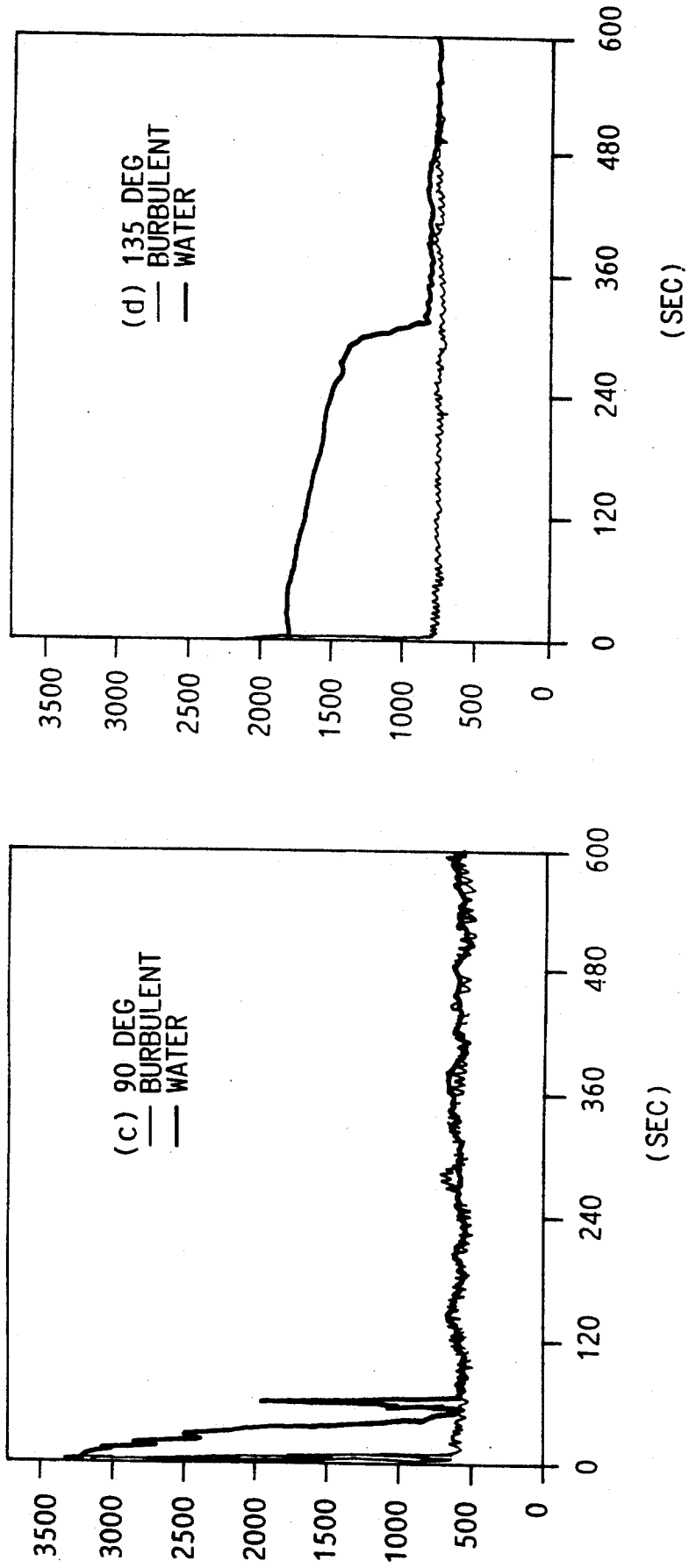
Figure 4F:
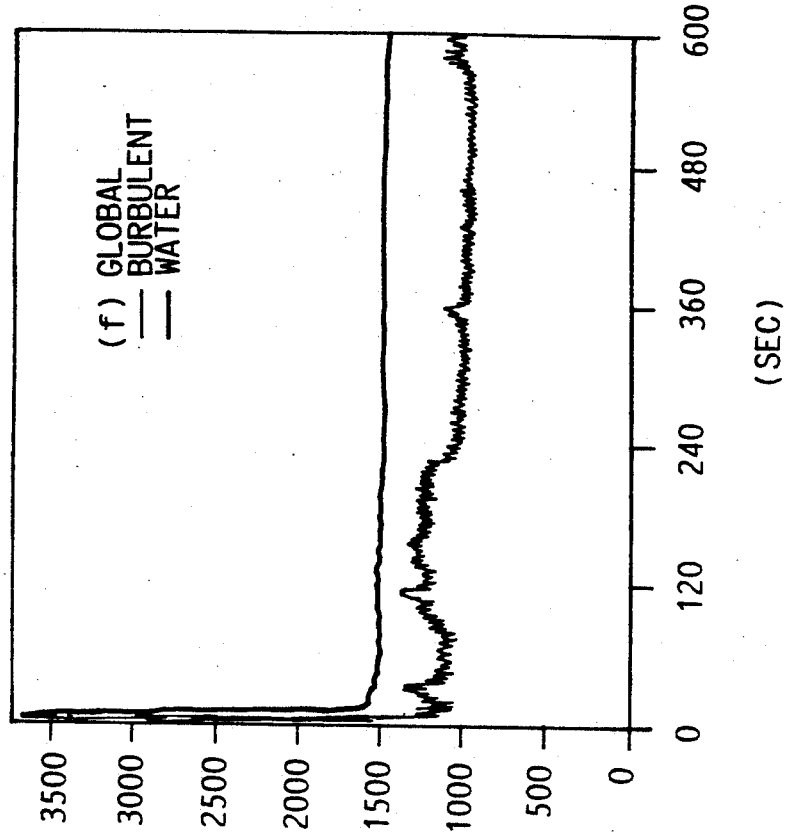
FIG. 4(f) shows the global plot for the sensor of FIGS. 4(a)–4(e) inclusive.
Figure 4E:
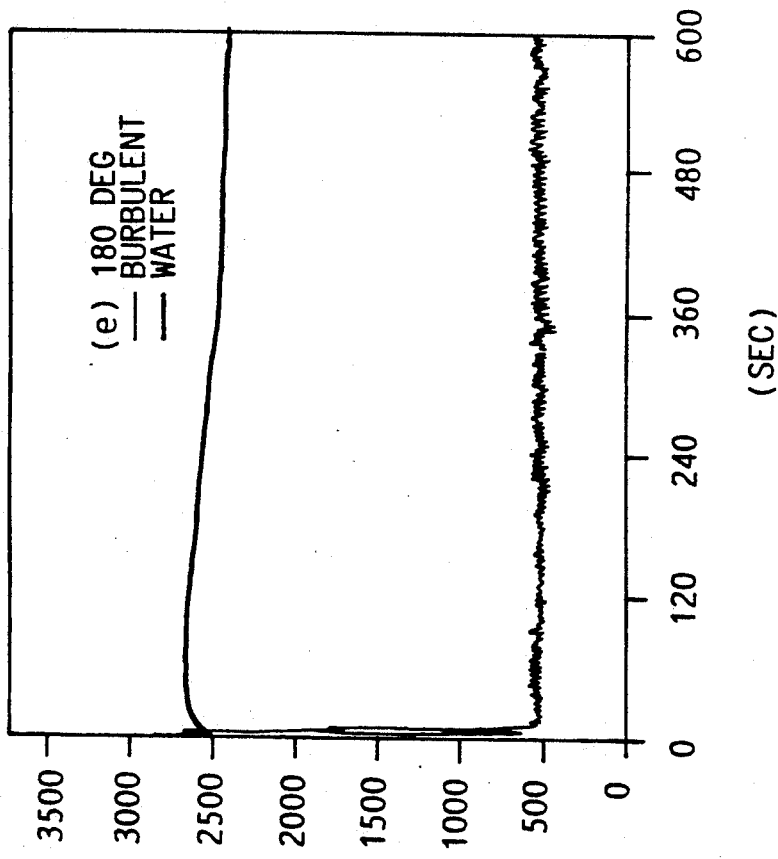
Figure 6A:
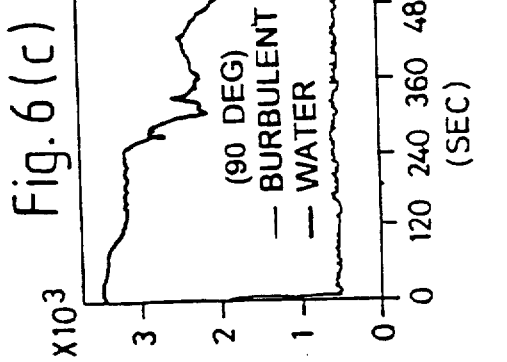
FIGS. 6(a)–6(f) show the corresponding plot to FIGS. 5(a)–5(f) for a 100 percent offset, vertical test section.
Figure 6B:
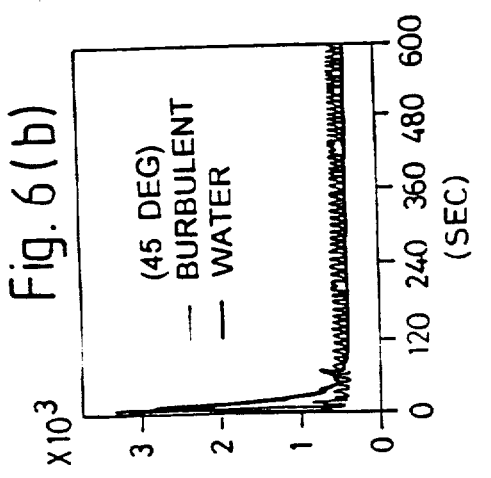
Figure 6C:
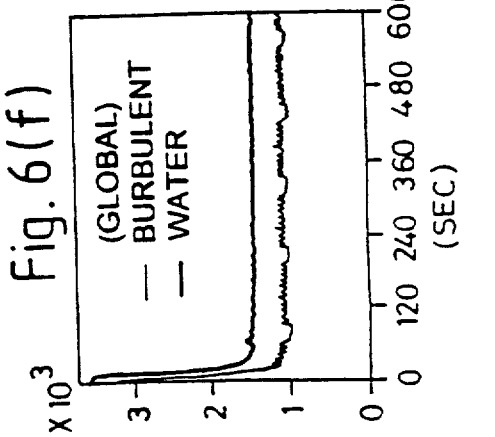
Figure 6D:
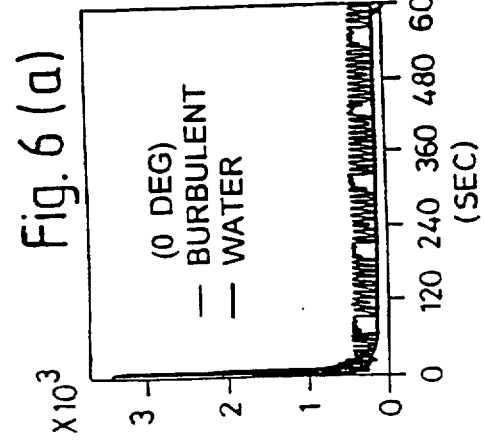
Figure 6E:
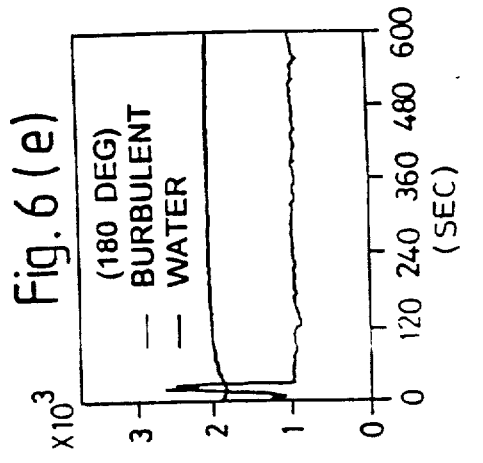
Figure 6F:
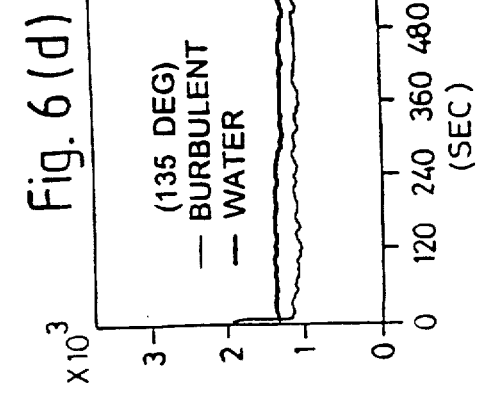

FIGS. 4a to 4b show the same data as in FIGS. 2 and 3, but organised slightly differently. From the two tests—one with the ordinary water wash (FIG. 2) and one with the bubbly, turbulent wash (FIG. 3)—there have been taken the traces for the same sensor—for instance, the 0° one or the 135° one—and the two have been plotted together, to show more clearly the difference, for that sensor, between an ordinary water wash and an inventive burbulent wash. In each case, the ordinary water trace is marked as a solid black line, while the bubbly, turbulent trace is a speckled line.

On the 0° wide side (4a) and on the 45° position (4b) the two cases are comparable. At the 90° position (4c) the bubbly, turbulent wash shows a clear advantage (it works faster), while at the 135° position (4d) the time improvement brought about by bubbly, turbulence is marked. The 180° results of 4e show the spectacular success of the burbulent flow—the mud was washed away within a few seconds, while in the ordinary water wash the mud was hardly touched even after 600 seconds. The global trace (4f) shows that with the water wash the conductivity fall misleadingly described the situation, but this was not so of the bubbly, turbulent wash.

FIGS. 5a to 5f show the same sort of results (as in 4a to 4f) for an inclined (horizontal) 50% offset test section with the narrow part underneath, while FIGS. 6a to 6f and FIGS. 7a to 7f respectively show the same sort of results for a 100% offset vertical and inclined (horizontal, narrow part below) test section.

Figure 7A:
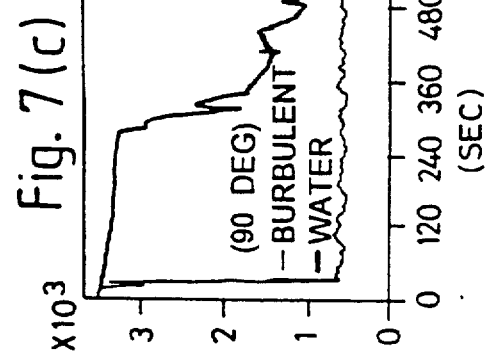
Figure 7B:
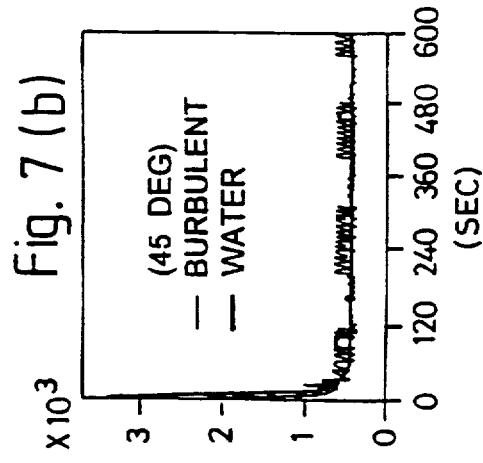
Figure 7A:
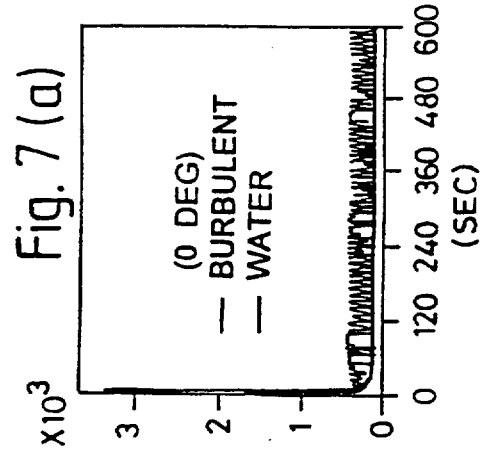
Figure 7C:
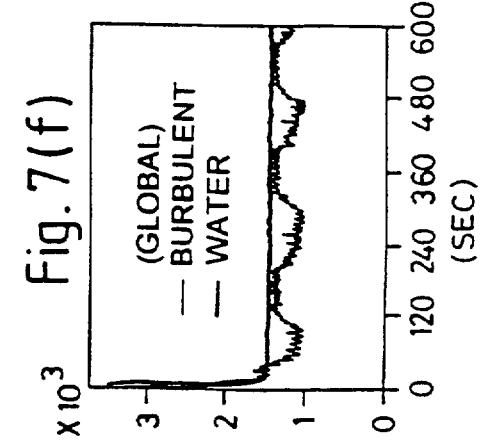
Figure 7E:
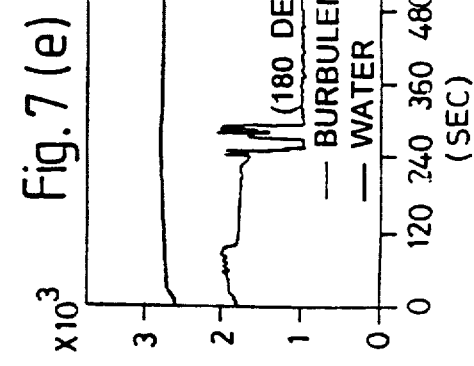
Figure 7D:
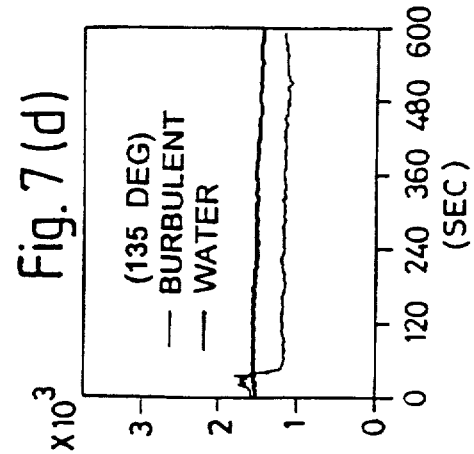

In the FIG. 5 series, for a 50% eccentric annulus, it will be noted that mud removal was affected by inclination, but not tremendously. Compared to a vertical annulus, the mud on the narrow side (the 180° position of 5e) takes almost twice as long to remove by a bubbly, turbulent wash, and remains immobile with a water wash. However, for the 100% eccentric annulus (the FIGS. 6 and 7 series), there is a considerable worsening. In the vertical case (FIG. 6) the immobility of mud under a water wash extends to the 90° position (6c), which requires over 40 hole volumes for anything like complete removal (and total immobility is seen at 135° and beyond; 6d and 6e), while in the horizontal case (FIG. 7) things are even worse. In each case the bubbly, turbulent wash is vastly superior, although even it needed about 7 hole volumes of water—28 hole volumes of air/water mixture—for the narrowest part in the horizontal case (FIG. 7e).

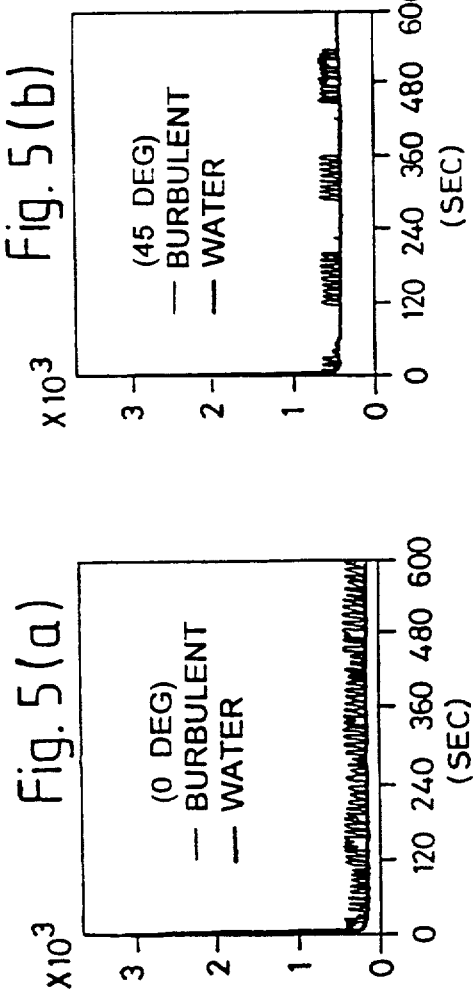
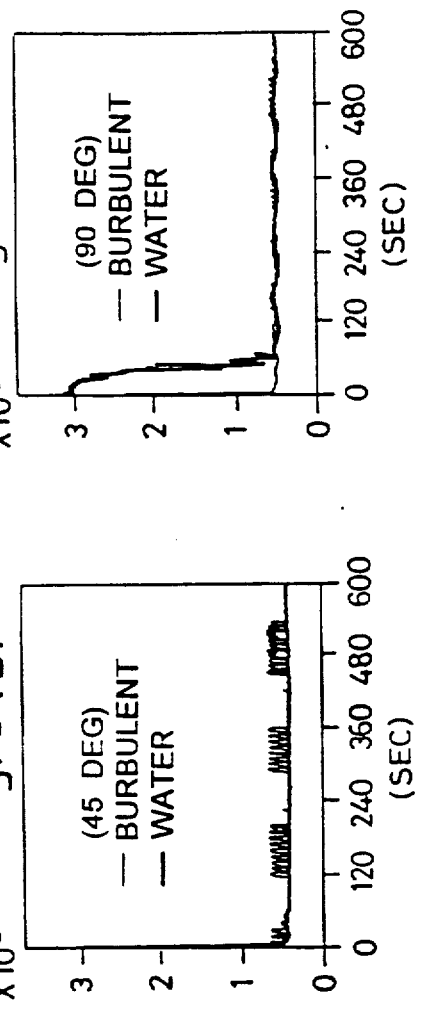
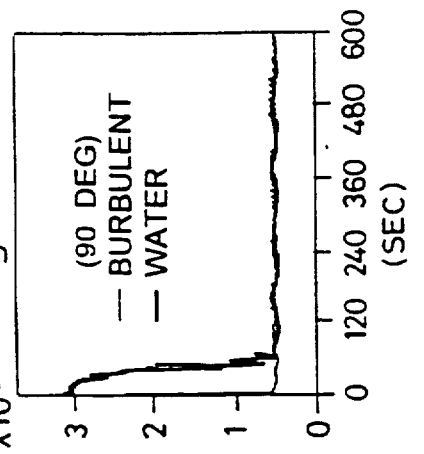
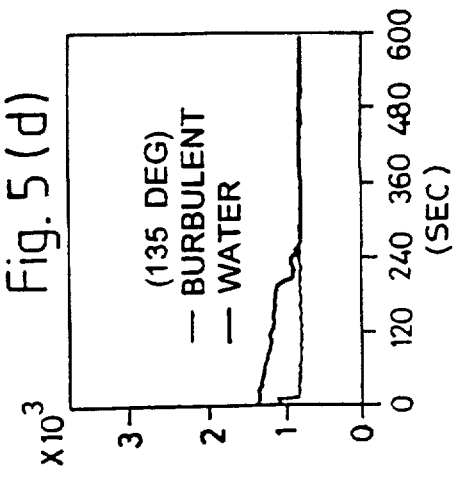
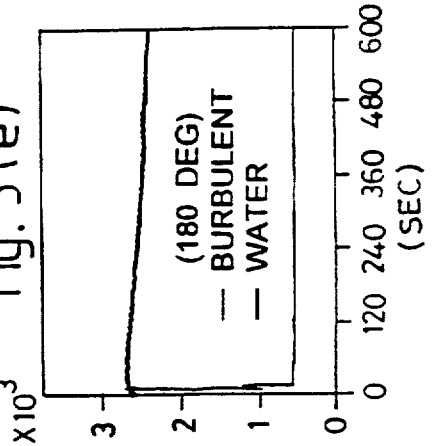
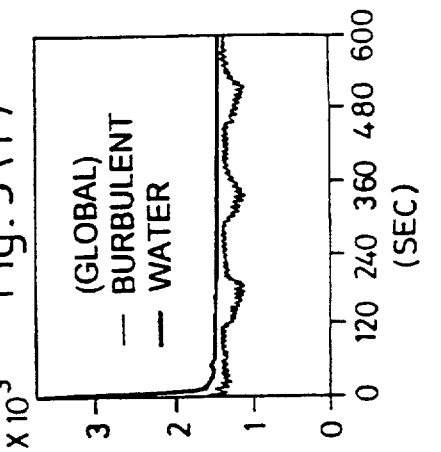

We claim:

1. A method of cementing a casing into a well comprising:
   a) suspending a casing in a well filled with a drilling fluid;
   b) displacing said drilling fluid with a wash fluid to remove deposits in the well bore which might affect bonding of cement, said wash fluid comprising a two phase fluid comprising a continuous liquid phase and a dispersed gaseous phase;
   c) mixing said liquid and gaseous phases together to form a bubbly turbulent flow at or near the bottom of the well bore;
   d) passing the wash fluid through the annulus formed between an outer surface of the casing and the well bore so as to clean deposits therefrom as the wash fluid passes through the annulus; and e) pumping cement into the well after the wash so as to fill the annulus between the casing and the well bore.

2. A method of cleaning a well bore prior to a cementing operation, said well bore having a casing suspended therein, being filled with a drilling fluid and having deposits on surfaces thereof which might affect bonding of cement, the method comprising:
   a) introducing a wash fluid liquid phase and a wash fluid gaseous phase to the well bore;
   b) mixing the wash fluid liquid phase and the wash fluid gaseous phase at or near the bottom of the well bore so as to form a bubbly turbulent flow in an annulus formed between an outer surface of the casing and the well bore; and
   c) passing the wash fluid through the annulus so as to clean deposits therefrom as the wash fluid passes therethrough.

3. A method as claimed in claim 2, wherein the wash fluid is formed by first introducing a plug of liquid into the casing at the surface followed by a plug of gas, the two plugs then being pumped to the bottom of the casing where they are allowed to exit into the annulus and mix to form the bubbly turbulent flow.

4. A method as claimed in claim 3, wherein the wash fluid is driven through the casing and the annulus by a cement slurry which is pumped into the casing after the wash.

5. A method as claimed in claim 3, wherein the flow rate of the wash fluid is such as to cause slug/churn flow in the annulus.

6. A method as claimed in claim 5, wherein the flow rate of the wash fluid liquid phase in the annulus is less than the flow rate of the wash fluid gas phase in the annulus.

7. A method as claimed in claim 6, wherein the wash fluid gas phase and wash fluid liquid phase flow rates for cleaning a well at a depth of 10,000 ft (3,050 m) are about 2.5 m/s for the liquid phase and 3 m/s for the gas phase.

8. A method as claimed in claim 6, wherein the gas phase and liquid phase flow rates for cleaning a well at a depth of 4,000 ft (1220 m) are about 1 m/s for the liquid phase and 2 m/s for the gas phase.

9. A method as claimed in claim 2, wherein the wash fluid liquid phase is water and the wash fluid gaseous phase is nitrogen.

* * * * *

UNITED STATES PATENT AND TRADEMARK OFFICE
CERTIFICATE OF CORRECTION

PATENT NO.   : 5,284,207
DATED        : February 8, 1994
INVENTOR(S)  : Bittleston et al.

It is certified that error appears in the above-identified patent and that said Letters Patent is hereby corrected as shown below:

In the drawings,
  delete    Figures 5(a) - 5(d) [second occurrence],
            Figures 6(a) - 6(f), and
            Figures 7(a) - 7(f), and
substitute therefore the attached
         -- Figures 5(a) - 5(f),
            Figures 6(a) - 6(f), and
            Figures 7(a) - 7(f) --

Signed and Sealed this

Twentieth Day of December, 1994

Attest:

BRUCE LEHMAN

*Attesting Officer*         *Commissioner of Patents and Trademarks*